Nov. 25, 1941.  H. J. FINDLEY  2,263,723
AIR CONDITIONING UNIT
Filed Sept. 28, 1939  2 Sheets-Sheet 1
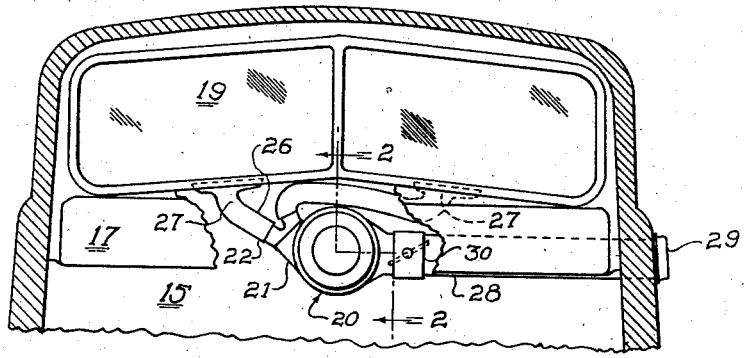
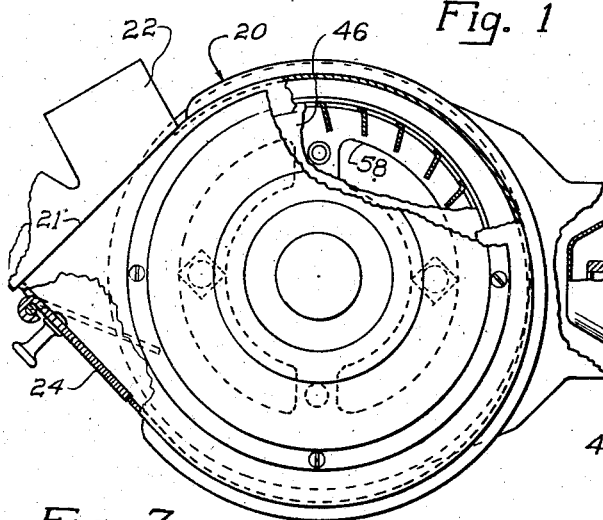
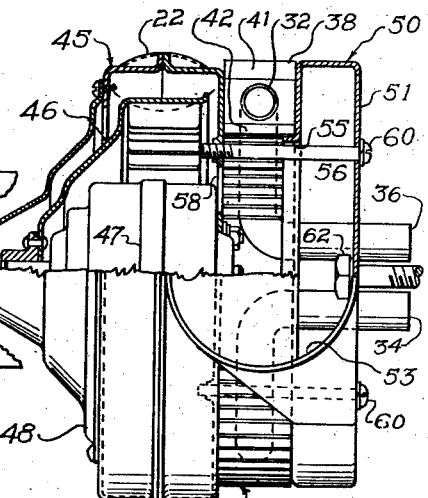
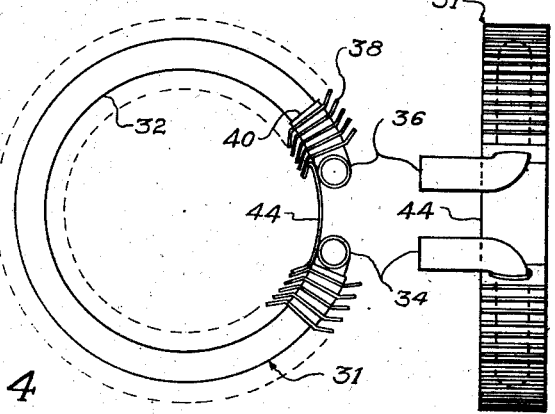
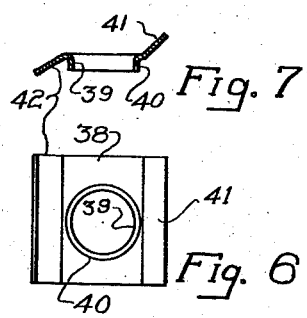
INVENTOR
HOWARD J. FINDLEY
BY John F. Stark
ATTORNEY

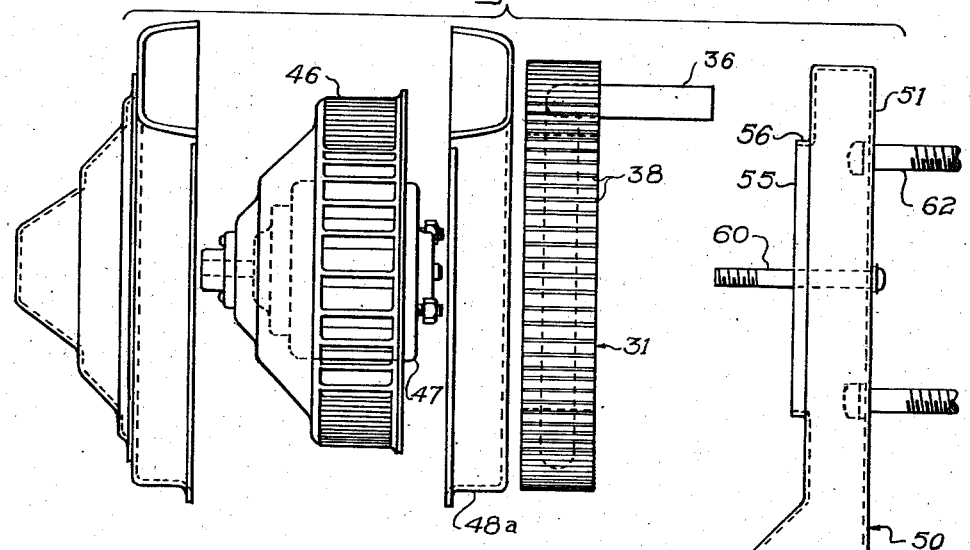
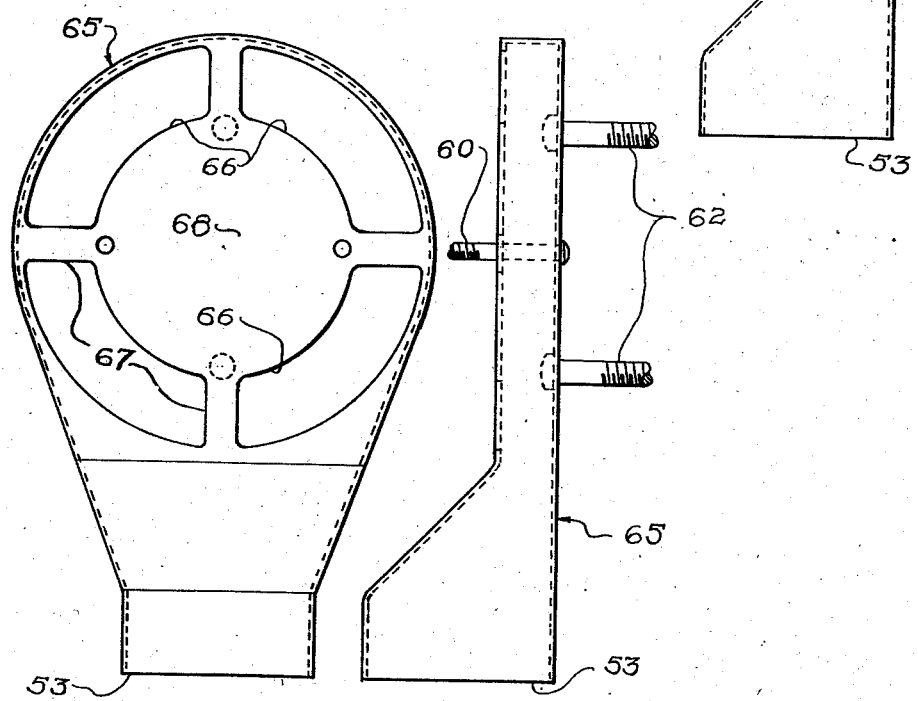

Patented Nov. 25, 1941

2,263,723

UNITED STATES PATENT OFFICE 2,263,723

AIR CONDITIONING UNIT

Howard J. Findley, Euclid, Ohio, assignor to Eaton Manufacturing Company, Cleveland, Ohio, a corporation of Ohio Application September 28, 1939, Serial No. 296,921

4 Claims. (Cl. 257—137)

The present invention relates to heat exchangers, and more particularly, concerns a means for providing tempered air in a vehicle passenger compartment adjacent the vehicle windshield so as to maintain the same substantially clear under all weather conditions.

Heretofore in this art the better passenger compartment heaters for vehicles have generally been provided with valve means for by-passing a portion or all of the heated air through one or more conduits to the windshield for effecting removal of fog, ice or snow. The large volume and pressure of tempered air required was generally deficient and performed unsatisfactorily because of the inherent nature of the heater structure and the tortuous restricted passage imposed upon the air transfer. More recently the development of heaters has been directed toward the use of two fans, mounted at one or the opposite ends of a motor, upon a common drive shaft. Certain of these heaters were arranged so that both air impellers were operated under full load at all times, one fan being used for heating the vehicle and the other used for air delivery to the windshield. Other constructions provided means for clutching or declutching the windshield fan when nominally required, or means providing a reversible driving motor and fixing the fans in reverse relation to each other, so that only one fan was under load at a time and the drain on the electrical system was at a minimum. However, these structures too have proved deficient because while sufficient air was delivered to the surface of the windshield, the air delivered to the passenger compartment as a whole was not uniform enough and resulted in a hot blast of air in spots adjacent the delivery face of the heater and a relatively starved quantity of heat to the rear compartment. Therefore, the most recent, and apparently logical trend, has been to provide separate units for the compartment heating and the movement of modulated air over the interior surface of the windshield. Thus by a more suitable location of each air moving unit and adherence to a single function for which it was designed great improvement in efficiency in each case has been effected.

The present invention has provided a novel solution of a vexing problem encountered when driving in certain weather conditions, of course the heater is equally well adapted for use under ordinary winter weather conditions when units of this type are usually used. That is to say, when operating a vehicle under weather conditions causing a relatively "dry" snow storm and at substantially close to or below freezing atmosphere. The use of a conventional windshield heater or defroster causes a rise in the face temperature of the windshield sufficient to partially melt the snow, and operation of the vehicle at even normal and especially at fast speeds, in view of the temperature differential existing between the inside and outside surface of the windshield, results in the ready freeze up of the snow rendering the wiper blade useless. On the other hand, the failure to use the windshield heater, or discharge of a stream of air across the windshield surface, results in the fogging of the windshield as the warm moist air of the closed passenger compartment gravitates towards the cooler windows and deposits its moisture thereon. However, if a quantity of cool dry air from outside the vehicle is blown across the inner face of the windshield the "dry" snow, under the above atmospheric conditions, will not be melted and may be brushed off clean by the wiper or blown off in transit by movement through the advancing air stream. Likewise, fresh air reduces the tendency of the windshield to fog by lowering the relative humidity of the vehicle compartment.

Accordingly, the primary object of this invention is the provision of a new and novel vehicle windshield heater and air moving structure including a novel compact heater core element and air box associated therewith for collecting fresh outside air received through a conduit in response to forward motion of the vehicle.

Other objects of the invention include the provision in a windshield heater as above described of means providing a heater core element composed of a single continuous core tube with a series of separate heat radiating fins assembled thereon in spaced relation, including an air circulating unit closely associated with one face of said core element, and an air collecting box adjacent the opposite face thereof for reception of fresh outside air forced through a conduit, in communication with an air deflector member in the vehicle cowl wall, in response to forward motion of the vehicle; the provision in a vehicle windshield heater as above described of means for driving an air impelling unit associated therewith to accelerate the delivery of tempered or untempered air through said heater casing to the vehicle windshield; the provision in a heater unit as above of valve means providing for selective use of fresh outside air or recirculated heated air for delivery to the inside face of the vehicle windshield, including other valve means located in the heater unit for selective by-passing of tempered air from the heater direct to the passenger compartment; the provision in a windshield defroster as above described, of means for by-passing fresh outside air from the air collecting box through the hollow center of the core element whereby untreated air may be distributed through conduits directly to the inner face of the vehicle windshield; the provision in a windshield defroster as above described of means for induction of fresh air from outside the vehicle and means comprising an air collecting box provided with air discharge outlets whereby to direct fresh outside air through an associated heater core element before passage to the vehicle windshield, and separate valve means in the defroster unit for selectively diverting the fresh heated air directly to the passenger compartment adjacent the driver's feet for spot heating.

Other objects of the invention include the provision in a windshield heater and defroster comprised of separate sections including an air circulating portion, an annular, hollow-center, single tube core element and an air collecting box, arranged for semi-telescopic relation therewith whereby to constitute a compact unit structure; the provision in a structure as above described for conduction of heat laden medium of a heater core element composed of a single continuous core tube shaped into a substantially circular conformation with the opposite ends thereof in abutting relation and extending parallel to each other and normal to the circular conformation, including a series of individual apertured heat radiating fins assembled on said circular portion of the core element and integrally bonded thereto.

Other objects and advantages of the present invention will become apparent from the following specification, the drawings relating thereto, and from the claims hereinafter set forth.

In the drawings in which like numerals are used to designate like parts throughout the several views:

Fig. 1 is a fragmentary elevational view of the interior of a vehicle having associated therewith a heating and defrosting unit embodying features of the present invention;

Fig. 2 is a view in which the upper half is a vertical section and the lower half is an elevation, taken substantially along the line 2—2 of Fig. 1;

Fig. 3 is an enlarged front elevational view with parts broken away showing some of the interior arrangement of the parts of the heater removed from the vehicle shown in Fig. 1;

Fig. 4 is an elevational view of the core structure removed from the heater shown in Fig. 1;

Fig. 5 is an end elevational view of the core shown in Fig. 4;

Fig. 6 is an elevational view of a single core radiating fin removed from the core structure of Fig. 5;

Fig. 7 is a vertical diametrical sectional view taken through the fin of Fig. 6;

Fig. 8 is an exploded top plan view of the main units of the heater showing the same in disassembled condition;

Fig. 9 is an elevational view of a modified form of air collecting box for use on the heater structure previously described;

Fig. 10 is a side elevational view of the air box shown in Fig. 9.

Referring now to the accompanying drawings, in Fig. 1 is shown an automobile having a dash 15, a windshield 19, shown as of the divided type, and an instrument panel 17. The heater and defroster assembly is shown generally at 20, it being understood that it is supported from the dash 15 and that the main flow of air therefrom is discharged through an enlarged opening 21 in its peripheral wall tangential thereto and into a Y-fitting 22 secured thereover. The auxiliary air stream from the heater 20 is shown by way of illustration as being by-passed through a valve 24 which when open discharges into the passenger compartment adjacent the driver's feet. The Y-fitting 22 has communicating therewith the branches 26 leading to nozzle-like members 27 which project through openings therefor in the upper edge of the instrument panel 17 and in a position to direct the air blast therefrom against the inner face of the windshield 19 on opposite sides of the center. A conduit 28 extends through a wall of the vehicle and on the outer end is connected to an air deflector 29, which diverts fresh outside air thereinto under forward motion of the vehicle, while the inner end of the conduit 28 is in communication with an air collecting box forming the rear face of the heater. Adjacent the inner end of the conduit 28 a valve 30 is mounted which when open permits the induction of fresh air into the air collecting box and to the heater core element for a heatless transfer through the hollow center thereof directly to the suction side of the blower wheel for distribution in untempered condition to the surface of the windshield, in a manner to be hereinafter described. The valves 24 and 30 may both be closed and recirculated air may be drawn from the vehicle and heated before delivery to the windshield, or the valve 24 be opened and valve 30 be closed for delivery of heated recirculated air into the passenger compartment adjacent the driver's feet.

Referring now to Figs. 2 to 7, inclusive, the heat exchanger or radiator core element per se comprises a single section of hollow tubing connected at the opposite ends thereof to a source of heat laden medium forming interconnected passages for the flow of heating medium therethrough. This heating medium may, of course, be any suitable substance but preferably in accordance with conventional constructions is either heated water from the internal combustion engine which drives the cooperating automobile or steam which is formed as a result of the operation of the engine. From an inspection of Fig. 4 and Fig. 5 it will be seen that the core has no headers for distributing and collecting heating fluid, and the single core tube is of the round type although obviously it may be flattened or oval in cross section. For purposes of illustration, and more particularly for use in conjunction with the disclosed air circulating means, the specific radiator shown has been arranged from a single tube 32 shaped into a circular form around a hollow axis or center and the opposite ends of the tube bent normal to the plane of the circular body providing an inlet 34 and a discharge 36, it being understood that the tubes 34 and 36 project forwardly through the dash 15 of the automobile and are there connected with a suitable source of heating medium and in such a manner as to cause a circulation of heating medium through the radiator 31.

The radiator 31 includes a plurality of spaced heat exchange fins 38 in accordance with conventional practice. However, in this instance and in accordance with one of the features of this invention, the fins 38 are individual rectangular plates formed with a central aperture 39, the wall 40 of which has been drawn down normal to the body of the plate and projects therefrom a short distance, as best shown in Figs. 6 and 7. The right and left hand sides 41 and 42, respectively, of the fin 38 have been bent away from the main body of the plate and extend in substantially opposite angular relation to the body of the fin and parallel to each other for a reason to be presently explained. It will be understood that the fin is preferably made of copper or other material having good heat radiating or absorbing qualities, and that the rectangular plate is most economically stamped and blanked out on a suitable punch press. In the assembling of the radiator the tube 32 is initially formed around a circular pattern and the opposite ends of the tube extend past each other in opposite directions and in spaced planes. A plurality of the fins 38 may now be threaded onto the tube 32 through the aperture 39 of the fin with the integral projection 40 thereof in a forward direction, whereby all the bent sections 41 and 42 of the fins are in close parallel and spaced nested relationship. After the requisite number of fins have been assembled on the tube, a space is reserved on either end for bending the tube at a right angle to the plane of the circular body and for extension of the exposed ends of the tube through the dash to be later connected to a source of heating medium. The radiator assembly may be dipped in any suitable tinning composition or solution and thence into a liquid soldering solution where the fins are securely soldered to the tube. It will now be apparent that the integral projection 40 serves to accurately and nicely space the fins 38 providing an air passage therebetween, while the marginal angularly bent sections 41 and 42 being in parallel relation present a tortuous radial inward passage to the entering air causing a turbulence therein which provides an improved wiping or scouring action of the untreated air in going through the heat transfer process. An arcuate shaped member 44, coextensive with the width of the fins 38, and which is soldered thereto, bridges the gap left by the spaced tube ends 34 and 36 completely closes the hollow circular space within the radiator and defines an air chamber therethrough. Of course, while the tube construction shown is formed into a single convolution, and would not have the heat transfer capacity of a conventional heat exchanger employing a pair of spaced headers and a plurality of interconnected passages for the flow of heating medium between them, the number of convolutions of the present radiator may be multiplied to secure any desired heating capacity, however, for the present use the single convolution has provided ample capacity in a most compact and efficient manner for its size.

The blower unit generally designated 45 is of the type shown and described in my co-pending application serially numbered 264,267, filed March 25, 1939, for Air crculator and has been modified here in conjunction with the present invention and only those parts of the air circulator which are necessary to the complete understanding of the present invention are herein referred to and described in detail. More particularly the blower unit is composed of an air impeller 46 of the centrifugal blower type that is operatively connected to a driving motor 47 through the cone shaped section thereof whereby the air impeller concentrically overlies the outer periphery of the motor. A two part shell or casing 48 and 48a comprises, respectively, an annular complementary shaped section for reception of the cone shaped end of the blower wheel and an annular dished section serves as a cover for the opposite end of the blower wheel and a support for the motor. The two pieces 48 and 48a of the shell are adapted to be secured together around their opposed marginal edges of the parting line thereof by any suitable means such as screws, spot welding or a snap ring over the adjacent opposed marginal edges. The blower shell assumes the form of substantially an involute spiral from which at the greatest radius the enlarged opening 21 extends tangential thereto and over which is clamped or otherwise suitably secured the Y-fitting 22. A second opening into the housing comprises the valve 24, adjacent to opening 21, whereby when open the air discharge from the heater may be diverted from the discharge opening 21 and delivered directly into the passenger compartment adjacent the driver's feet.

An air collecting box generally designated 50 comprises a substantially flat annular body portion 51 coextensive in diameter with the radiator 31 and the blower unit 45 and terminates in an air intake opening extending from the side thereof which tapers from the flat body portion to a relatively enlarged circular terminal opening 53 arranged to communicate with the conduit 28. The air box 50 in this instance may have a circular air discharge opening 55 stamped out from the inner wall of the flat body portion 51 and which has a diameter equal to the hollow center through the radiator 31, whereby a projection 56, integral with the wall opening 55, extends therethrough a short distance and provides for support of the radiator and imparts a heatless air transfer through the radiator to the blower unit air intake 58.

In Fig. 8 the main units of the heater are shown in an exploded top plan view. From an inspection of the units in disassembled condition it will be apparent the several component parts thereof are designed for exceedingly compact assembly, in fact a full size embodiment of the heater measures approximately only six inches in thickness from the rear wall of the air box to the apex of the cone housing and approximately seven inches in diameter. In the blower unit the blower wheel 46 and driving motor 47 therefore are concentrically mounted with respect to each other and the sub-assembly mounted within the chamber defined by the two piece shell construction 48 and 48a. The air box 50 abuts against the opposite side of the radiator 31 with the annular projection 56, of the air box, projecting into the hollow center of the radiator locating the pieces longitudinally, and suitable through openings in the walls of the air box provide passages for the radiator tubes 34 and 36 and location of the pieces radially. Screw means 60 extending from the outer wall of the air box through the hollow center of radiator are threaded into suitable openings in the inner wall of the shell section 48a that supports the motor 47 and provides means for drawing the separate units into a compact assembly. Other screw means 62 project through the outer wall of the air box 50 and are arranged to extend through the dash or other wall of the vehicle to support the heater in place.

In the operation of the structure so far described, assuming that a flow of heat exchange medium is being circulated through the radiator 31, and that the valve 30 of Fig. 1 is closed, when the motor 47 is energized it will cause the centrifugal blower 46 to rotate. The blower wheel in rotating will draw air radially in through the spaced passages between the exposed fins 38 and around the core tube of the radiator 31, and this air will be heated in passing therethrough and upon being discharged by the blower wheel through the opening 21 will be forced into the Y-fitting 22 for delivery to the interior surfaces on the windshield 19, or other desired location in the vehicle body. The above assumed set of facts and conditions of operation are predicated upon a temperature differential existing between the inside and outside of the vehicle windshield causing a deposition of the relatively humid moisture content of the passenger compartment air as it strikes the windshield and a desire to remove the resultant fog. Under a weather condition which does not cause the formation of fog or frosting of the windshield, and when it is desired to utilize the heat in warming a portion of the passenger compartment, the valve 24 may be opened thus by-passing the heated air from the opening 21 directly to the passenger compartment adjacent the driver's feet for auxiliary spot heating.

Now under a weather condition as first mentioned, namely, a dry snow storm accompanied by an atmospheric temperature near or below the freezing point, as aforementioned, if heated air is discharged against the inner face of the windshield the dry snow will become moistened or partially melted, sticking to the outer surface of the windshield and freeze thereon, when the vehicle is being driven at a moderate rate and especially so when driven at fast speeds. The conventional windshield wiper will not remedy this condition when used in conjunction with the usual windshield heater because, under the assumed weather conditions, the wiper blade only rides over the moistened snow stuck to the windshield and tends to pack or glaze the snow thereby hastening the freezing operation. Likewise, ceasing the operation of the windshield heater which will thereby not cause the dry snow to become moistened or sticky, but will permit its being blown away at periodic intervals by the advancing air stream when the vehicle is in motion, is not a satisfactory solution because there is ever present a fogging or steaming of the closed windows of the vehicle and especially the windshield which must be kept clear for safe driving. Therefore, assuming the conditions as above, in the use of the present invention the driver may open the valve 30 thereby permitting the induction of fresh outside air, through the conduit 28 and deflector 29, in response to forward motion of the vehicle. The dry fresh air is received from the inner end of the conduit 28 into the air box 50, and upon energizing the blower motor 47 the blower wheel 46 will draw air, which following the path of least resistance will now be received from the discharge opening 55 of the air box under pressure, and not through the passage between fins 38 of the radiator 31 as previously. The fresh air thus passing through the hollow center of the radiator undergoes substantially a heatless transfer and then passes through the openings 58 in the shell 48a where it may be picked up by the blower wheel 46 and discharged through the opening 21 into the Y-fitting 22 and distributed in untempered condition to the inner surfaces of the windshield. In so far as this applicant is aware, all other existing windshield cleaning devices designed primarily for that purpose and now available, do not contain the combined features of the present structure in the novel compact and efficient manner disclosed.

It has been determined that recirculated, moisture-laden, heated air of the passenger compartment will not maintain the windshield clean under the above dry snow condition, however, it is also true that completely untreated dry outside air is not necessary to remove fog or steam from the windshield; so long as the air discharged over the face of the windshield has a relative humidity comparable with the relatively dry outside atmosphere that is sufficient. Accordingly, a modified form of air box generally designated 65 is illustrated in Figs. 9 and 10, for use in conjunction with the present structure and which is substantially similar to the air box 50 hereinbefore described, therefore, like numerals are used to designate similar parts in the two members and only the variations therefrom will be described. In this instance the air discharge opening 55, shown in the wall of air box 50, and which provided for delivery of air in a heatless transfer through the hollow center of the radiator 31, has been left a blank and the arcuate openings 66, spaced by the radial arms 67, in the wall 68 of the air box 65 have been substituted. The openings 66 are disposed substantially on the same radius that the fins 38 of the radiator 31 are whereby when the air box 65 is drawn up flush to one side of the radiator, in a manner similar to that shown for air box 50 in Fig. 2, air from the box 65 will be discharged laterally into the spaces between the fins 38 and thence radially inward through the hollow center of the radiator and through the openings 58 of the blower housing 48a where the centrifugal blower 46 picks up the air and discharges the same to a selected location, assuming of course that the motor 47 has been energized.

In the operation of the structure just described fresh outside air is deflected by the air scoop 29, extending from the cowl of the vehicle and is inducted through the conduit 28 in communication therewith at its outer end and the air box 65 at its inner end, in response to forward motion of the vehicle. Air under pressure in the box 65 will be forced through the arcuate openings 66 laterally into the spaces between the fins 38 to wipe the heat conducting surfaces thereof and thence radially inward into the hollow center of the radiator, assuming the blower unit 45 is operating and causing an area of reduced pressure therein which the air following the path of least resistance would normally take. From the interior of the radiator 31 the heated air is drawn through the openings 58 of the blower housing section 48a where the centrifugal blower 46 picks it up and discharges the same through the opening 21 for distribution to the surfaces of the windshield, or selectively, through the by-pass valve 34 for delivery direct to the passenger compartment. Optionally the valve 30 may be closed, as in the first structure, and only recirculated air may be used, in which case the air is drawn radially inward between the spaced fins 38 into the center of the radiator 31 and thence through the openings 58 to the blower wheel 46 where it may be selectively discharged for delivery to surfaces of the windshield 19 or through the by-pass valve 24 directly to the passenger compartment for spot heating.

While the present invention has been described particularly in connection with a windshield heater for which use it is primarily intended, it will be understood that portions or all of the presently suggested structures might be advantageously utilized in connection with heat exchange in general. Moreover, numerous changes in construction and rearrangement of the parts might be resorted to without departing from the spirit of the invention as defined by the claims.

What I claim is:

1. In an automotive vehicle windshield defroster of the character described including a heater core, conduit means including a valve therein arranged to induct fresh outside air in response to forward motion of the vehicle, said core comprising a single core tube defining an annular unobstructed air channel through the center thereof and including a plurality of separate heat radiating fins closely assembled on said core tube providing a plurality of substantially radially disposed air flow passages into the hollow center of said core, an air collecting housing secured tightly against the fins on one face of said core and having an intake opening in communication with said conduit means and a discharge opening in registration with the central air channel of said core, an air impeller means including an associated housing secured to said air collecting housing and spaced therefrom by the fins on the opposite face of said core to draw air from the air channel of said core, and to distribute the same through one or more conduits to the surface of the vehicle windshield, said conduit valve means, when in an open position, permitting fresh outside air to pass through the central air channel of the core in unheated condition to said impeller and when in closed position cutting off the fresh air supply whereby said impeller may draw vehicle air only through said core by way of the radial passages between the fins.

2. In an apparatus of the character described, a heater core, said core comprised of at least one core tube defining a relatively narrow cylindrical body having a hollow center therethrough and terminating in axially spaced faces, a plurality of separate heat radiating fins threaded on said core tube and bonded thereto in spaced relation by spacers integral with said fins and defining therebetween a series of substantially radially disposed air passages, an air box secured tightly against the fins on one axial face of said core, an air impeller and associated housing secured tightly to said air box and spaced therefrom against the fins on the opposite axial face of said core and having an axial air intake opening in registration with the hollow center of said core; and means for driving said air impeller causing movement of air axially from said air box in a substantially heatless transfer through the hollow center of said core, or selectively, radially through the air spaces between said heat radiating fins according to the degree of resistance imposed upon the air stream.

3. In an automotive vehicle apparatus of the character described including a finned heater core having spaced axial faces, said core having separate air channels therethrough defining a central annular unobstructed air channel and radially disposed spaced fins providing heat transfer passages, respectively, said heat transfer passages of the core having greater resistance to air movement therethrough than said central air channel, means including an air box secured tightly against the fins on one axial face of said core for inducting fresh outside air to said core in response to forward motion of the vehicle, a control valve for said fresh air means, permitting passage of unheated fresh air through the air channel of the core to the vehicle compartment and, when in a closed position, to provide for passage of recirculated heated air through said radially disposed heat transfer passages of the core, and air impeller means secured tightly against the fins on the opposite axial face of said core and effecting movement of tempered or untempered air radially and/or axially through the core according to the degree of resistance imposed thereon by said control valve.

4. In an automotive vehicle windshield heater or defroster including a finned heater core having spaced axial faces, said core having separate air channels therethrough defining a central annular unobstructed air channel and radially disposed spaced fins providing heat transfer passages respectively, said heat transfer passages of the core being open to the vehicle compartment and having greater resistance to air movement therethrough than said central air channel, means including an air box secured tightly against the fins on one axial face of said core and including a control valve for inducting fresh outside air to said core in response to forward motion of the vehicle, air impeller means including an associated housing secured tightly against the fins on the opposite axial face of said core to draw heated air through said radial heat transfer passages and central air channel of the core when said fresh air control valve is closed and unheated fresh air through said central air channel of the core when said control valve is opened, and said housing having one or more discharge openings for delivery of heated or unheated fresh air to the surface of the windshield or to the passenger compartment, selectively, and in accordance with said control valve position.

HOWARD J. FINDLEY.